Sept. 2, 1924.

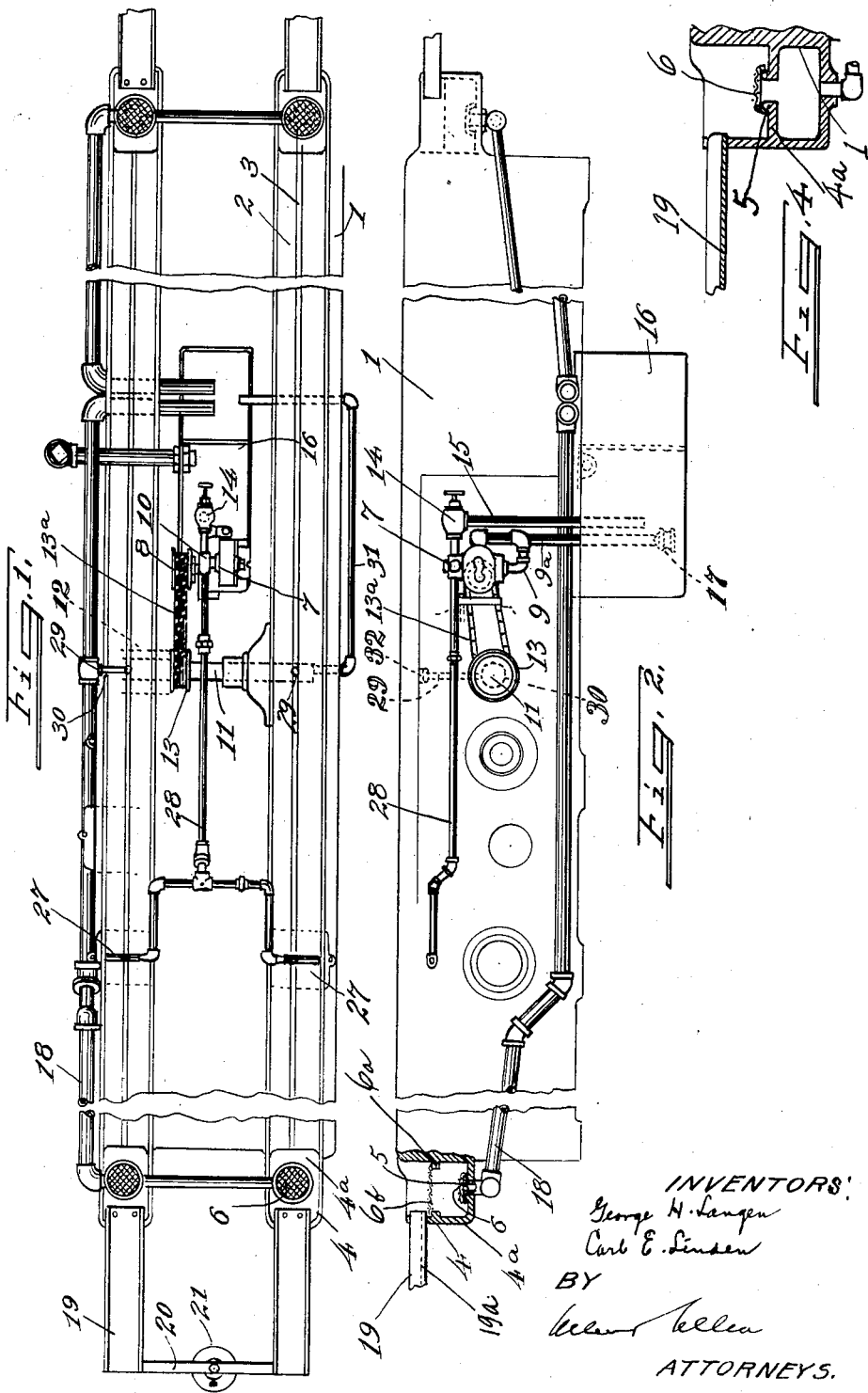

G. H. LANGEN ET AL 1,507,070

PLANER LUBRICATING DEVICE

Filed Dec. 9, 1920

INVENTORS:
George H. Langen
Carl. E. Linden
BY
ATTORNEYS.

Patented Sept. 2, 1924.

1,507,070

UNITED STATES PATENT OFFICE.

GEORGE H. LANGEN AND CARL E. LINDEN, OF CINCINNATI, OHIO, ASSIGNORS TO THE CINCINNATI PLANER COMPANY, OF CINCINNATI, OHIO, A CORPORATION OF OHIO.

PLANER LUBRICATING DEVICE.

Application filed December 9, 1920. Serial No. 429,333.

*To all whom it may concern:*

Be it known that we, GEORGE H. LANGEN and CARL E. LINDEN, citizens of the United States, and residents of the city of Cincinnati, in the county of Hamilton and State of Ohio, have invented certain new and useful Improvements in Planer Lubricating Devices, of which the following is a full, clear, and exact description, reference being had to the drawings, forming part of this specification.

Our invention relates to lubrication devices for planers wherein a forced feed of oil is provided for the planer V's and preferably to the shaft bearings also.

In planer lubrication the general policy in the past has been to provide an independently operated pump for oil, wherein the forced oil feed did not bear any relation to the movement of the planer table. Our invention relates to oiling systems wherein the oil pump is operated in time with the planer table itself, insuring a flow of oil during operative movements and a cessation of flow idle periods and with which oil may also be fed to the bearings, so that only a single pump is required.

It is our object to provide a reversible oil pump preferably of the "gear pump" type, wherein rapidly revolving gears provide a centrifugal reaction to draw the oil into a chamber and eject it therefrom in a steady stream. Such pumps operate whether the gears are driven clockwise or counterclockwise and thus may be driven from the main driving shaft of the planer.

It is our object to provide a planer bed, which is so cast that it will accommodate an oil tank for return oil and oil storage, the casting being so made that the tank can be put in place after the machine has been set up. Furthermore this permits also the installation of the pump mechanism within the bed itself.

Another object of our invention is to provide a new type of oil pocket, to take the oil from the planer bed V's, which pocket has cast therein an integral member adapted to receive without machining a suitable oil strainer.

Our pump and its connections are also bolted in place within the bed, and so shipped, same being fully protected against injury during shipment and at all other times by being sunk within the bed.

Our object is further to so form and drill the bed that running from a channel at the base of the V's thereof are ducts leading to the various shaft bearings, these ducts being protected by strainers and small return pipes led from the under side of the bearings to the main return pipes.

These various objects and other advantages which will be noted we accomplish by that certain construction and arrangement of parts to be hereinafter more specifically pointed out and claimed.

In the drawings,

Figure 1 is a top plan view of the machine with certain of the gears, shafts and bearings omitted for purposes of clearness.

Figure 2 is a side elevation showing the same parts as Figure 1.

Figure 4 is a detail showing a modification of the oil pocket construction.

Figure 3:
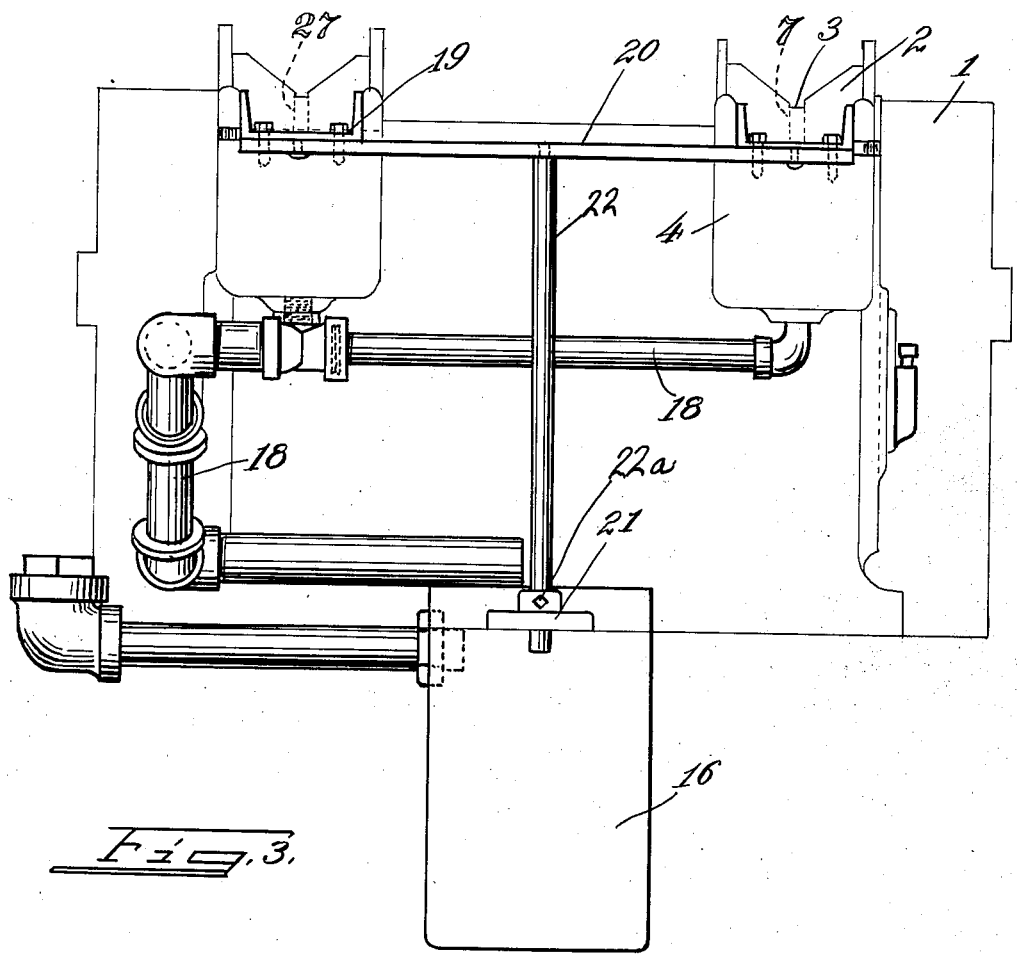
Figure 3 is an end elevation on a larger scale than Figures 1 and 2, showing the trough devices for catching oil flung beyond the bed pockets during over movements of the table.

The bed is indicated generally at 1, having the table guiding V's, 2, 2, said V's being formed with a channel 3 at the base thereof.

At the ends of the V's are located pockets 4 to receive the oil from the V's. These pockets are formed so as to avoid the necessity of machining the parts for the necessary strainers and for ready and easy cleaning.

As a preferred construction two strainers are employed. The base of the pocket around the outlet is formed with an upturned flange or annulus 5 and a fine mesh strainer cap 6 can be readily fitted over the annulus without any machining.

In addition to this lugs 6[a] are cast in the four corners of the pocket and upon these lugs is laid an additional strainer plate 6[b].

As a modification of this construction in which only one strainer is used as shown in Figure 4, an integral web 4[a] is cast in the pocket with the annulus 5 around the central opening and over this annulus the strainer cap is fitted.

Secured within the bed is a gear pump 7 of any desired type, same having a driving shaft equipped with a pulley 8. The driving of this pulley will revolve the gears within the pump which by a familiar principle will draw in oil from a pipe 9 and expel it through a pipe 10, no matter which direction the drive is applied to the shaft. Instead of driving the pump by belt and pulley it will be understood, of course, that any other convenient method of drive may be employed such as by chain or gearing, and that any type of reversible pump will serve.

The main drive shaft is shown at 11, having bearings 12, and a pulley 13 which through the medium of a belt 13ª drives the pump shaft pulley. Attached to the outlet pipe of the pump is a relief valve 14 which has a by-pass pipe 15 directed to the oil tank.

The bed 1 is formed to permit of the installation of the pump and its connection within the space beneath and between the V's preferably between the main drive shaft and the planer uprights. The oil tank 16 is preferably not secured in place in the bed prior to shipment but is an independent part, the bed having plenty of opening between the V's forward of the pump.

When the machine is set up the tank may readily be slipped down through the bed, moved into place between the sides of the bed, and the pipe 9ª for the pump and the by-pass pipe 15, installed. The intake pipe 9ª will be equipped with a fine mesh strainer 17 of suitable type.

The oil return pipes running from the end pockets of the bed are pipes 18 securely mounted along the outside of the bed and communicating with the space beneath which is the oil tank.

In order to provide for catching of oil carried by the table when it moves beyond the V's of the bed, we provide extension trough pieces 19, the inner ends of which are directed into the pockets. These troughs are supported at the outer end by a cross bar or plate 20 extending from one trough to the other and to which the troughs are bolted. The cross bar is mounted centrally on the standard 22 which is suitably mounted in the base plate 21 so as to slide up and down and be held in any adjusted position by the set screw 22ª or in any suitable way. By adjusting the height of the standard the ends of the trough pieces can be raised or lowered to obtain the proper flow of the oil back into the end pockets. This construction also serves as a safety device to avoid accidents.

In order to prevent any oil creeping around the ends of the troughs and dropping on the floor, we form one or more lengthwise grooves 19ª on the under surface of the trough pieces at the discharge end.

The bed V's are formed with holes 27, 27, therein which holes are fed with the oil forced from the pump through pipes 28, 28, that communicate with the pump outlet pipe.

We prefer to oil the bearings of the various shafts by a novel arrangement which has been illustrated as applied only to the main shaft bearings but which it will be understood could as well be applied to the other bearings and will be so constructed in our preferred design. The construction includes ducts or holes 29, bored down from the channel at the base of the bed V's to the bearings, which bearings have pipes 30 extending from their bases to the oil return pipes. On the side which is not equipped with the main oil return we provide a small pipe 31 connected to the pipes 30, and mounted close to the bed, so that it can be installed previous to shipment, if desired. Strainers 32 of fine wire mesh or felt are set into the holes or ducts 29, same being available through the V channels, for cleaning, and adapted to prevent filings or whatnot from gaining access to the shaft bearings.

With our forced oil feed and double straining, together with the rapid sweep of oil over the V's, we do not find that the usual objection to journal bearing lubrication from the V's has any force since dirt cannot get to the bearings and the oil flowing by gravity to them is always perfectly filtered or strained.

Having thus described our invention, what we claim as new and desire to secure by Letters Patent, is:—

1. The combination with a planer bed, having interspaced table carrying rails, and a table driving mechanism, of an oil pump mounted on the bed intermediate the rails, connections from the pump to the carrying rails and to an oil supply return oil connections from the carrying rails, said pump and connections being secured to the planer bed and the connections terminating in a series of pipes, located within a defined space, said table, pump mechanism and driving mechanism being so arranged that a tank can be inserted between the rails into operative relation with said connections, without dismounting any substantial parts, and a tank adapted to be so set.

2. In a planer, a bed, table supporting V's on the bed, means for supplying lubricant to the V's and pockets formed at the ends of the V's for trapping excess lubricant, said pockets being located beyond the ends of the V's and oil catching troughs, mounted in alignment with the V's and beyond the pockets for the purpose of returning excess oil caused by table movement beyond the V's.

3. In a planer, a bed, table supporting V's on the bed, means for supplying lubricant to the V's and pockets formed at the ends of the V's for trapping excess lubricant, said pockets being located beyond the ends of the V's and oil catching troughs, mounted in alignment with the V's and beyond the pockets and means for adjustably supporting said troughs to regulate the return of the excess oil caused by table movement beyond the V's.

4. In a planer, a bed, table supporting V's on the bed, means for supplying lubricant to the V's and pockets formed at the ends of the V's for trapping excess lubricants, said pockets being located beyond the ends of the V's and oil catching troughs, mounted in alignment with the V's, and beyond the pockets, a cross bar for securing the troughs together at their outer ends, with an adjustable standard for adjusting the height of the troughs to regulate the return of excess oil to the pockets.

5. In a planer, a bed, table supporting V's on the bed, means for supplying lubricant to the V's and pockets formed at the ends of the V's for trapping excess lubricant, said pockets being located beyond the ends of the V's and oil catching troughs, mounted in alignment with the V's and beyond the pockets for the purpose of returning excess oil caused by table movement beyond the V's, with a transverse groove or grooves on the undersurface of the troughs to prevent leaking of oil at the delivery end.

6. In a planer a bed, table supporting V's on the bed, means for supplying lubricant to the V's, pockets at the ends of the V's for receiving excess lubricant, said pockets provided with an outlet in the bottom thereof, and an integral web formed across the pocket above the outlet, said web formed with an annulus surrounding an opening therein, and a strainer arranged over said annulus, for the purpose described.

7. In a planer, a bed therefor, table supporting V's on the bed, bearings in the bed for the operating shafts, said bed having holes extending from the base of the V's to tops of the bearings, for transfer of oil from the V's to the bearings by gravity.

8. In a planer, a bed therefor, table supporting V's on the bed, bearings in the bed for the operating shafts, said bed having holes extending from the base of the V's to the tops of the bearings, for transfer of oil by gravity from the V's to the bearings, said holes having strainers set therein for the purpose described.

9. In a planer, a bed therefor, table guiding V's thereon forced feed lubrication means for the V's, said V's having channels formed at the bases thereof, bearings for operating shafts formed in the bed, said bed having holes therein extending from the channels at the base of the V's to the bearings, and oil return pipes extending from the lower faces of the bearings to the lubrication means for the purpose described.

GEORGE H. LANGEN.
CARL E. LINDEN.